United States Patent
Hying et al.

(10) Patent No.: US 6,620,320 B1
(45) Date of Patent: Sep. 16, 2003

(54) ION-CONDUCTING COMPOSITE WHICH IS PERMEABLE TO MATTER, METHOD FOR PRODUCING SAID COMPOSITE, AND USE OF THE SAME

(75) Inventors: Christian Hying, Rhede (DE); Gerhard Hörpel, Nottuln (DE); Bernd Penth, Lebach (DE)

(73) Assignee: CREAVIS Gesellschaft fuer Technologie und Innovation mbH, Marl (DE)

( * ) Notice: Subject to any disclaimer, the term of this patent is extended or adjusted under 35 U.S.C. 154(b) by 0 days.

(21) Appl. No.: 09/463,414

(22) PCT Filed: Mar. 20, 1999

(86) PCT No.: PCT/DE99/00875
§ 371 (c)(1),
(2), (4) Date: Feb. 28, 2000

(87) PCT Pub. No.: WO99/62620
PCT Pub. Date: Dec. 9, 1999

(30) Foreign Application Priority Data

Jun. 3, 1998 (DE) .......................... 198 24 666

(51) Int. Cl.$^7$ ............................... B01D 71/02
(52) U.S. Cl. ...................... 210/500.25; 210/500.26; 210/490; 264/45.1; 55/523; 55/524
(58) Field of Search ............ 210/490, 500.25, 210/500.26, 510.1; 428/307.7; 264/45.1; 427/372.2; 55/523, 524

(56) References Cited

U.S. PATENT DOCUMENTS

| 5,232,681 | A | * | 8/1993 | Hartung |
| 5,342,521 | A | * | 8/1994 | Bardot et al. |
| 5,376,442 | A | * | 12/1994 | Davidson et al. |
| 5,885,657 | A | | 3/1999 | Penth |
| 6,299,778 | B1 | * | 10/2001 | Penth et al. |
| 6,309,545 | B1 | * | 10/2001 | Penth et al. |
| 6,383,386 | B1 | * | 5/2002 | Hying |

FOREIGN PATENT DOCUMENTS

| WO | WO 96/00198 | * | 1/1996 |
| WO | WO 99/15262 | * | 4/1999 |

* cited by examiner

*Primary Examiner*—Ana Fortuna
(74) *Attorney, Agent, or Firm*—Oblon, Spivak, McClelland, Maier & Neustadt, P.C.

(57) ABSTRACT

The invention relates to an ion-conducting composite which is permeable to matter, to a method for producing an ion-conducing composite which is permeable to matter, and to the use of this composite in various processes. Membranes or ion-conducting materials are used for various chemical and physical process, e.g., electrolysis, electrodialysis. The membranes used are often polymer-based. These polymers are relatively non-resistant to solvents and high temperatures. Therefore, the aim of the invention is to provide an ion-conducting composite. The inventive composite consists of inorganic constituents or at least mainly of inorganic constituents, and is characterised in that is very stable in relation to acids and high temperatures. According to the invention, ion-conducting materials or materials which will be ion-conducting after an additional treatment are added to a composite which is permeable to matter during production. Alternatively, the finished composite is treated with said materials.

61 Claims, No Drawings

ION-CONDUCTING COMPOSITE WHICH IS PERMEABLE TO MATTER, METHOD FOR PRODUCING SAID COMPOSITE, AND USE OF THE SAME

The present invention relates to a permeable composite material having ion-conducting properties.

Ion-conducting materials of the prior art are in service in very broad scope in technology and are used for the most diverse applications. In this context there could be cited in particular not only the applications in electrodialysis as anion or cation exchange membranes but also the application as diaphragms in electrolysis or membrane-electrolysis cells as well as the membrane in pervaporation modules. Further fields of application can be found in the area of energy production with fuel cells. There is also known, however, an entire series of electrochemical or catalyzed reactions which take place on ion-conducting materials or are catalyzed thereby.

At present, predominantly polymer materials bearing ionic groups are used for these applications. The modified polysulfones, polyether sulfones, polystyrenes and modified polyvinylidine fluoride and polytetrafluoroethylene in particular could be cited in this context. These materials have performances completely adequate for most applications. Nevertheless, these polymers are subject to limits as regards the temperature range in which they can be used. At a temperature of about 120° C. or above, for example, either softening of the material occurs or the materials are no longer sufficiently swellable to ensure good ion conduction.

Inorganic materials such as zeolites or other aluminosilicates are indeed characterized by better thermal stability, but frequently are not sufficiently stable in acid media, with the result that slow decomposition of the materials takes place during operation. Thus they also have fields of application only in a limited area, such as in the sodium sulfide/sulfur cell (energy storage) or in some electrolysis apparatuses.

PCT/EP98/05939 describes a permeable composite material and a process for making the same. This permeable composite material is characterized by high thermal stability, but it lacks ion-conducting properties.

The purpose of the present invention was to find a material which still has good ion conduction even at temperatures of up to 250° C. and which at the same time is insensitive to relatively high acid concentrations.

It has been surprisingly found that it is possible to impart ion-conducting properties to a permeable composite material based on at least one porous and permeable support, which is provided on at least one side of the support and in the interior of the support with at least one inorganic component, which contains substantially at least one compound of a metal, a semi-metal or a mixed metal with at least one element of Group 3 to Group 7, while retaining its good thermal stability and resistance to acids.

The subject matter of the present invention is therefore a permeable composite material based on at least one porous and permeable support, which is provided on at least one side of the support and in the interior of the support with at least one inorganic component, which contains substantially at least one compound of a metal, a semi-metal or a mixed metal with at least one element of Group 3 to Group 7, which composite material is characterized in that it exhibits ion-conducting properties.

Also subject matter of the present invention is a process for making a composite material based on at least one porous and permeable support, which is provided on at least one side of the support and in the interior of the support with at least one inorganic component, which contains substantially at least one compound of a metal, a semi-metal or a mixed metal with at least one element of Group 3 to Group 7, which process is characterized in that a composite material with ion-conducting properties is made.

Further subject matter of the present invention is the use of a composite material according to at least one of claims 1 to 20 as a catalyst for acid or base catalyzed reactions.

The ion-conducting composite material according to the invention is characterized by good ion-conducting properties. Contrary to the general assumption that materials having good ion conduction must be pore-free, it has been found that materials having good ion conduction do not absolutely have to be pore-free, but instead the pore size merely has to be smaller than a certain limit value. If the pore surfaces contain ionogenic groups, ion conduction takes place in the form of a surface diffusion mechanism. Provided the porosity is quite high, this mechanism of ion migration leads to high ion fluxes through the material, so that current densities of greater than 50 $mA \cdot cm^{-2}$ can be achieved.

Not only good conductivity but also the greatest possible permselectivity is necessary for use of membranes in electrodialysis or as a proton-conducting membrane in fuel cells. This requirement is also thoroughly satisfied by the composite material according to the invention. The permselectivities of the ion-conducting composite materials according to the invention and used as membrane materials lie in the range of 0.75 to 0.98 depending on the material used.

The composite material according to the invention will be described hereinafter by reference to an example, without being limited thereto.

The permeable composite material according to the invention based on at least one porous and permeable support, which on at least one side of the support and in the interior of the support is provided with at least one inorganic component, which substantially contains at least one compound of a metal, a semi-metal or a mixed metal with at least one element of Group 3 to Group 7, exhibits ion-conducting properties. As used in the present invention, the term interior of a support refers to cavities or pores in a support.

According to the invention, the porous and permeable support can have interstices with a size of 0.02 to 500 $\mu$m. The interstices can be pores, meshes, holes, crystal lattice interstices or cavities. The support can contain at least one material chosen from carbon, metals, alloys, glass, ceramics, minerals, plastics, amorphous substances, natural products, composite substances or from at least one combination of these materials. It is permissible for supports which can contain the said materials to have been modified by a chemical, thermal or mechanical treatment method or a combination of treatment methods. Preferably the composite material is provided with a support which contains at least one metal, one natural fiber or one plastic, which was modified by at least one mechanical forming technique or treatment method, such as drawing, upsetting, fulling, rolling, stretching or forging. Quite particularly preferably the composite material is provided with at least one support which contains at least woven, bonded, felted or ceramically bound fibers or at least sintered or bonded shapes, globules or particles. In a further preferred embodiment there can be used a perforated support. Permeable supports can also be such which become or have been made permeable by laser treatment or ion beam treatment.

It can be advantageous if the support contains fibers of at least one material chosen from carbon, metals, alloys, ceramics, glass, minerals, plastics, amorphous substances, composite substances and natural products or fibers of at least one combination of these materials, such as asbestos, glass fibers, carbon fibers, metal wires, steel wires, steel-wool fibers, polyamide fibers, coconut fibers, coated fibers. Preferably there are used supports containing woven fibers of metal or alloys. Wires can also be used as metal fibers. Quite especially preferably the composite material is provided with a support which contains at least one fabric of steel or stainless steel, such as a fabric made by weaving from steel wires, steel fibers, stainless-steel wires or stainless-steel fibers, which fabric preferably has mesh widths of 5 to 500 $\mu$m, especially preferably mesh widths of 50 to 500 $\mu$m, and quite especially preferably mesh widths of 70 to 120 $\mu$m.

The support of the composite material, however, can also comprise at least one expanded metal with a pore size of 5 to 500 $\mu$m. According to the invention, however, the support can also comprise at least one granular, sintered metal, one sintered glass or one metal fleece with a pore width of 0.1 $\mu$m to 500 $\mu$m, preferably of 3 to 60 $\mu$m.

The composite material according to the invention is preferably provided with at least one support which contains at least aluminum, silicon, cobalt, manganese, zinc, vanadium, molybdenum, indium, lead, bismuth, silver, gold, nickel, copper, iron, titanium, platinum, stainless steel, steel, brass, an alloy of these materials or a material coated with Au, Ag, Pb, Ti, Ni, Cr, Pt, Pd, Rh, Ru and/or Ti.

The inorganic component present in the composite material according to the invention can contain at least one compound of at least one metal, semi-metal or mixed metal with at least one element of Group 3 to Group 7 of the Periodic Table or at least one mixture of these compounds. The compounds of the metals, semi-metals or mixed metals can therefore contain at least elements of the subgroups and of Group 3 to Group 5 or at least elements of the subgroups or of Group 3 to Group 5, these compounds having a particle size of 0.001 to 25 $\mu$m. Preferably the inorganic component contains at least one compound of an element of Subgroup 3 to Subgroup 8 or at least one element of Group 3 to Group 5 with at least one of the elements Te, Se, S, O, Sb, As, P, N, Ge, Si, C, Ga, Al or B or at least one compound of an element of Subgroup 3 to Subgroup 8 and at least one element of Group 3 to Group 5 with at least one of the elements Te, Se, S, O, Sb, As, P, N, Ge, Si, C, Ga, Al or B or a mixture of these compounds. Especially preferably the inorganic component contains at least one compound of at least one of the elements Sc, Y, Ti, Zr, V, Nb, Cr, Mo, W, Mn, Fe, Co, B, Al, Ga, In, Tl, Si, Ge, Sn, Pb, Sb or Bi with at least one of the elements Te, Se, S, O, Sb, As, P, N, C, Si, Ge or Ga, such as $TiO_2$, $Al_2O_3$, $SiO_2$, $ZrO_2$, $Y_2O_3$, BC, SiC, $Fe_3O_4$, SiN, SiP, nitrides, sulfates, phosphides, silicides, spinels or yttrium aluminum garnet, or of one of these of the elements themselves. The inorganic component can also contain aluminosilicates, aluminum phosphates, zeolites or partly exchanged zeolites, such as ZSM-5, Na ZSM-5 or Fe ZSM-5 or amorphous microporous mixed oxides, which can contain up to 20% nonhydrolyzable organic compounds, such as vanadium oxide silica glass or alumina silica methylsilicon sesquioxide glasses.

Preferably at least one inorganic component is present in a particle-size fraction with a particle size of 1 to 250 nm or with a particle size of 260 to 10,000 nm.

It can be advantageous if the composite material according to the invention contains at least two particle-size fractions of at least one inorganic component. Likewise it can be advantageous if the composite material according to the invention contains at least two particle-size fractions of at least two inorganic components. The particle-size ratio can range from 1:1 to 1:10,000, preferably from 1:1 to 1:100. The quantitative ratio of the particle-size fractions in the composite material can preferably range from 0.01:1 to 1:0.01.

The permeability of the composite material according to the invention is limited by the particle size of the at least one inorganic component used to particles with a particular maximum size.

The composite material according to the invention is characterized in that it has ion-conducting properties and that in particular it is ion-conducting at a temperature of from −40° C. to 300° C., preferably from −10° C. to 200° C.

The composite material contains at least one inorganic and/or organic material which exhibits ion-conducting properties. This material can be present as an admixture in the microstructure of the composite material. It can also be advantageous, however, if the interior and/or exterior surfaces of the particles present in the composite material are coated with a layer of an inorganic and/or inorganic material.

Such layers have a thickness of 0.0001 to 1 $\mu$m, preferably a thickness of 0.001 to 0.05 $\mu$m.

In a particular embodiment of the ion-conducting composite material according to the invention, there is present in the void volume of the composite material at least one inorganic and/or organic material which exhibits ion-conducting properties. This material fills the void volume completely or partly, preferably completely. In particular, at least one inorganic and/or organic material which exhibits ion-conducting properties fills the interstices of the composite material.

It can be advantageous if the material which exhibits ion-conducting properties contains ionic groups from the group of alkylsulfonic acid, sulfonic acid, phosphoric acid, alkylphosphonic acid, dialkylphosphinic acid, carboxylic acid, tetraorganylammonium, tetraorganylphosphonium groups or mixtures of these groups with the same charge. These ionic groups can be organic compounds bound chemically and/or physically to inorganic particles. Preferably the ionic groups are bound via aryl and/or alkyl chains to the interior and/or exterior surface of the particles present in the composite material.

The ion-conducting material of the composite material can also be an organic ion-conducting material, such as a polymer. Especially preferably this polymer is a sulfonated polytetrafluoroethylene, a sulfonated polyvinylidene fluoride, an aminolyzed polytetrafluoroethylene, an aminolyzed polyvinylidene fluoride, a sulfonated polysulfone, an aminolyzed polysulfone, a sulfonated polyether imide, an aminolyzed polyether imide or a mixture of these polymers.

As inorganic ion-conducting materials there can be present in the composite material at least one compound from the group of oxides, phosphates, phosphides, phosphonates, sulfates, sulfonates, vanadates, stannates, plumbates, chromates, tungstates, molybdates, manganates, titanates, silicates, aluminosilicates and aluminates or mixtures of these compounds at least of one of the elements Al, K, Na, Ti, Fe, Zr, Y, Va, W, Mo, Ca, Mg, Li, Cr, Mn, Co, Ni, Cu or Zn or a mixture of these elements.

As inorganic ion-conducting materials, however, there can also be present at least one partly hydrolyzed compound from the group of oxides, phosphates, phosphites, phosphonates, sulfates, sulfonates, vanadates, stannates, plumbates, chromates, tungstates, molybdates, manganates, titanates, silicates, aluminosilicates and aluminates or mixtures of these compounds at least of one of the elements Al, K, Na, Ti, Fe, Zr, Y, Va, W, Mo, Ca, Mg, Li, Cr, Mn, Co, Ni, Cu or Zn or a mixture of these elements. As the inorganic ion-conducting material, preferably there is present in the ion-conducting composite material according to the invention at least one amorphous and/or crystalline compound at least of one of the elements Zr, Si, Ti, Al, Y or vanadium, or silicon compounds bearing some nonhydrolyzable groups, or mixtures of these elements or compounds.

The ion-conducting composite material according to the invention can be flexible. Preferably the ion-conducting composite material is bendable to a minimum radius of as small as 1 mm.

The process according to the invention for making an ion-conducting composite material will be described hereinafter with reference to an example, without limiting the process according to the invention to such production.

The ion-conducting permeable composite materials can be made in various ways. On the one hand, a composite material can be made using ion-conducting materials or materials which exhibit ion-conducting properties after a further treatment. On the other hand, composite materials which are already permeable can be treated with ion-conducting materials or with materials which exhibit ion-conducting properties after a further treatment.

The process according to the invention for making a composite material which exhibits ion-conducting properties relies on a process for making a composite material based on at least one porous and permeable support, which is provided on at least one side of the support and in the interior of the support with at least one inorganic component, which contains substantially at least one compound of a metal, a semi-metal or a mixed metal with at least one element of Group 3 to Group 7. This production process is described in detail in PCT/EP98/05939.

In this process for making the composite material, at least one suspension containing at least one inorganic component comprising at least one compound of at least one metal, one semi-metal or one mixed metal with at least one of the elements of Group 3 to Group 7 is applied in and on at least one porous and permeable support, and the suspension is solidified on or in or on and in the support material by at least one heat treatment.

In this process it can be advantageous to apply the suspension on and in or on or in at least one support by forcing on, pressing on, pressing in, rolling on, doctoring on, spreading on, dipping, spattering or pouring on.

The porous and permeable support on which or in which or on which and in which at least one suspension is applied can contain at least one material chosen from carbon, metals, alloys, ceramics, minerals, plastics, amorphous substances, natural products, composite substances, composite materials or from at least one combination of these materials. As the permeable support there can also be used such made permeable by treatment with laser beams or ion beams. Preferably fabrics of fibers or wires of the materials cited hereinabove are used as supports, examples being metal fabrics or plastic fabrics.

The suspension used, which can contain at least one inorganic component and at least one metal oxide sol, at least one semi-metal oxide sol or at least one mixed metal oxide sol or a mixture of these sols, can be prepared by suspending at least one inorganic component in at least one of these sols.

The sols are obtained by hydrolyzing at least one compound, preferably at least one metal compound, at least one semi-metal compound or at least one mixed-metal compound with at least one liquid, one solid or one gas, in which process it can be advantageous if water, alcohol or an acid, for example, is used as the liquid, ice as the solid or steam as the gas, or if at least one combination of these liquids, solids or gases is used. It can also be advantageous to add the compound to be hydrolyzed to alcohol or an acid or a combination of these liquids before hydrolysis. As the compound to be hydrolyzed there is preferably hydrolyzed at least one metal nitrate, one metal chloride, one metal carbonate, one metal alcoholate compound or at least one semi-metal alcoholate compound, especially preferably at least one metal alcoholate compound, one metal nitrate, one metal chloride, one metal carbonate or at least one semi-metal alcoholate compound chosen from the compounds of the elements Ti, Zr, Al, Si, Sn, Ce and Y or of the lanthanoids and actinoids, such as titanium alcoholates, for example titanium isopropylate, silicon alcoholates, zirconium alcoholates, or a metal nitrate, such as zirconium nitrate.

It can be advantageous to perform the hydrolysis of the compounds to be hydrolyzed with at least half the molar ratio of water, steam or ice relative to the hydrolyzable group of the hydrolyzable compound.

The hydrolyzed compound can be peptized with at least one organic or inorganic acid, preferably with a 10 to 60% organic or inorganic acid, especially preferably with a mineral acid chosen from sulfuric acid, hydrochloric acid, perchloric acid, phosphoric acid and nitric acid or a mixture of these acids.

There can be used not only sols prepared as described hereinabove, but also commercial sols such as titanium nitrate sol, zirconium nitrate sol or silica sol.

It can be advantageous if at least one inorganic component with a particle size of 1 to 10,000 nm is suspended in at least one sol. Preferably there is suspended an inorganic component containing at least one compound chosen from metal compounds, semi-metal compounds, mixed metal compounds and metal mixed compounds with at least one of the elements of Group 3 to Group 7, or at least one mixture of these compounds. Especially preferably there is suspended at least one inorganic component containing at least one compound comprising the oxides of the subgroup elements or the elements of Group 3 to Group 5, preferably oxides chosen from the oxides of the elements Sc, Y, Ti, Zr, Nb, Ce, V, Cr, Mo, W, Mn, Fe, Co, B, Al, In, Tl, Si, Ge, Sn, Pb and Bi, examples being $Y_2O_3$, $ZrO_2$, $Fe_2O_3$, $Fe_3O_4$, $SiO_2$, $Al_2O_3$. The inorganic component can also contain aluminosilicates, aluminum phosphates, zeolites or partly exchanged zeolites, such as ZSM-5, Na ZSM-5 or Fe ZSM-5 or amorphous microporous mixed oxides, which can contain up to 20% nonhydrolyzable organic compounds, such as vanadium oxide silica glass or alumina silica methylsilicon sesquioxide glasses. Preferably the proportion by weight of the suspended component amounts to 0.1 to 500 times the hydrolyzed compound used.

Freedom from cracks in the composite material according to the invention can be optimized by appropriate choice of the particle size of the suspended compounds as a function of the size of the pores, holes or interstices of the porous permeable support, and also by the layer thickness of the composite material according to the invention as well as by the proportional ratio of sol, solvent and metal oxide.

In order to increase freedom from cracks in the use of a mesh fabric with a mesh width of 100 $\mu$m, for example, there can preferably be used suspensions which contain a suspended compound with a particle size of at least 0.7 $\mu$m. In general, the ratio of particle size to mesh or pore size should range from 1:1000 to 50:1000. The composite material according to the invention can preferably have a thickness of 5 to 1000 $\mu$m, especially preferably 50 to 150 $\mu$m. The suspension of sol and compounds to be suspended preferably has a ratio of sol to compounds to be suspended ranging from 0.1:100 to 100:0.1, preferably from 0.1:10 to 10:0.1 parts by weight.

The suspension present on or in or on and in the support can be solidified by heating this composite to 50 to 1000° C. In a special alternative embodiment of the process according to the invention, this composite is exposed to a temperature of 50 to 100° C. for 10 minutes to 5 hours. In a further special embodiment of the process according to the invention, this composite is exposed to a temperature of 100 to 800° C. for 1 second to 10 minutes.

The heat treatment of the composite according to the invention in the manner can be accomplished by means of heated air, hot air, infrared radiation, microwave radiation or electrically generated heat. In a special embodiment of the process according to the invention it can be advantageous if the heat treatment of the composite is performed using the support material for electrical resistance heating. For this purpose the support can be connected to a current source via at least two contacts. With the current turned on, the support becomes heated in proportion to amperage of the current source and amplitude of the output voltage, and the suspension present in and on its surface can be solidified by this heating.

In a further particularly preferred embodiment of the process according to the invention, the solidification of the suspension can be accomplished in that the suspension is applied on or in or on and in a preheated support and thus is solidified directly after application.

According to the invention the ion-conducting composite material can be obtained by using at least one polymer-bound Brönstedt acid or base for making the composite material. Preferably the ion-conducting composite material can be obtained by using at least one sol, which contains polymer particles bearing fixed charges or polyelectrolyte solutions. It can be advantageous if the polymers bearing fixed charges or the polyelectrolytes have a melting or softening point below 500° C. Preferably there are used as polymers bearing fixed charges or as polyelectrolytes sulfonated polytetrafluoroethylene, sulfonated polyvinylidene fluoride, aminolyzed polytetrafluoroethylene, aminolyzed polyvinylidene fluoride, sulfonated polysulfone, aminolyzed polysulfone, sulfonated polyether imide, aminolyzed polyether imide or a mixture thereof. The proportion of the polymers bearing fixed charges or of the polyelectrolytes in the sol being used ranges preferably from 0.001 wt % to 50.0 wt %, especially preferably from 0.01% to 25%. The polymer can undergo chemical and physical or chemical or physical modification during production and processing of the ion-conducting composite material.

By adding to the sol used for making the composite material a small quantity of a polymer which bears acid or basic groups and also has a certain thermal stability, such as Nafion®, there can be made an ion-conducting permeable composite material with particular properties. During solidification of the material, the polymer melts. It surrounds the respective inorganic particles as a thin film, and so there are formed at the surfaces pores which have an Ionogenic character and are very suitable for ion conduction. Because the heat treatment is brief, only very slight degradation of the charges in the polymer takes place. If the polymer proportion is increased during production, the layers on the particles become progressively larger, until the point is reached at which the pores are completely filled. Thereby there is achieved directly in one process step a nonporous ion-conducting composite material supported by the porous support. Its ion conductivity is reduced by the quantity of particles, but it has better mechanical strength than the starting material. This is particularly important for applications at higher temperatures.

The ion-conducting composite material can also be obtained, however, by using, during production of the composite material, a sol which contains at least one ion-conducting material or at least one material which exhibits ion-conducting properties after a further treatment. Preferably there are added to the sol materials which lead to formation of inorganic ion-conducting layers on the interior and/or exterior surfaces of the particles contained in the composite material.

According to the invention, the sol can be obtained by hydrolyzing at least one metal compound, at least one semi-metal compound or at least one mixed-metal compound or a combination of these compounds with a liquid, a gas and/or a solid. Preferably water, steam, ice, alcohol or acid or a combination of these compounds is used as the liquid, gas and/or solid for hydrolysis. It can be advantageous to add the compound to be hydrolyzed to alcohol and/or to an acid before hydrolysis. Preferably there is hydrolyzed at least one nitrate, chloride, carbonate or an alcoholate of a metal or semi-metal. Especially preferably the nitrate, chloride, carbonate or alcoholate to be hydrolyzed is a compound of the elements Ti, Zr, V, Mn, W, Mo, Cr, Al, Si, Sn and/or Y.

It can be advantageous if a compound to be hydrolyzed bears nonhydrolyzable groups in addition to hydrolyzable groups. Preferably an alkyltrialkoxy or dialkyldialkoxy or trialkylalkoxy compound of the element silicon is used as such a compound to be hydrolyzed.

The ion-conducting components on the interior and/or exterior surfaces are then incompletely converted hydroxyl groups, which are bound in the crystal lattice and therefore permit exclusively surface diffusion, without being affected themselves. If zeolites or β-aluminosilicates are now also added as particles to the sol, there is obtained an almost homogeneous composite material which exhibits almost homogeneous ion-conduction properties.

According to the invention, there can be added to the sol for making the composite material at least one acid or base which is soluble in water and/or alcohol. Preferably there is added an acid or base of the elements Na, Mg, K, Ca, V, Y, Ti, Cr, W, Mo, Zr, Mn, Al, Si, P or S.

The sol used for making the ion-conducting composite material in the manner according to the invention can also contain nonstoichiometric metal, semi-metal or nonmetal oxides or hydroxides, generated by changing the oxidation number of the corresponding element. The change in oxidation number can be achieved by reaction with organic compounds or inorganic compounds or by electrochemical reactions. Preferably the change of oxidation number is achieved by reaction with an alcohol, aldehyde, sugar, ether, olefin, peroxide or metal salt. Examples of compounds which can change oxidation number in this way are Cr, Mn, V, Ti, Sn, Fe, Mo, W or Pb.

According to the invention it can be advantageous if there are added to the sol substances which lead to formation of inorganic ion-conducting structures. Examples of such substances can be zeolite and/or α-aluminosilicate particles.

As an example, there can therefore be made in the manner according to the invention an ion-conducting permeable composite material constructed almost exclusively from inorganic substances. In this connection the sol composition is a relatively important factor, since a mixture of different hydrolyzable components must be used. These individual components must be carefully matched to one another as regards their hydrolysis rate. It is also possible to generate the nonstoichiometric metal oxide hydrate sols by appropriate redox reactions. The metal oxide hydrates of the elements Cr, Mn, V, Ti, Sn, Fe, Mo, W or Pb are readily accessible in this way. The ion-conducting compounds on the interior and exterior surfaces are then different partly hydrolyzed or nonhydrolyzed oxides, phosphates, phosphides, phosphonates, stannates, plumbates, chromates, sulfates, sulfonates, vanadates, tungstates, molybdates, manganates, titanates, silicates or mixtures of these of the elements Al, K, Na, Ti, Fe, Zr, Y, Va, W, Mo, Ca, Mg, Li, Cr, Mn, Co, Ni, Cu or Zn or mixtures of these elements.

In a further preferred embodiment of the process according to the invention, already existing permeable ion-conducting or non-ion-conducting composite materials can be treated with ion-conducting materials or with materials which exhibit ion-conducting properties after a further treatment. Such composite materials can be commercial permeable materials or composite materials, or else composite materials as described, for example, in PCT/EP98/05939. It is also possible, however, to use composite materials obtained by the process described hereinabove.

According to the invention, there are obtained ion-conducting permeable composite materials by treating, with at least one ion-conducting material or with at least one material which exhibits ion-conducting properties after a further treatment, a composite material which has a pore width of 0.001 to 5 $\mu$m and which exhibits or does not exhibit ion-conducting properties.

The treatment of the composite material with at least one ion-conducting material or at least one material which exhibits ion-conducting properties after a further treatment can be accomplished by impregnating, dipping, brushing, rolling on, doctoring on, spraying or other coating techniques. After the treatment with at least one ion-conducting material or at least one material which exhibits ion-conducting properties after a further treatment, the composite material is preferably heat-treated. Especially preferably the heat treatment is performed at a temperature of 100 to 700° C.

Preferably the ion-conducting material or the material which exhibits ion-conducting properties after a further treatment is applied on the composite material in the form of a solution with a solvent proportion of 1 to 99.8%. According to the invention, there can be used as the material for making the ion-conducting composite material polyorganylsiloxanes which contain at least one ionic constituent. The polyorganylsiloxanes can contain among other substances polyalkylsiloxanes and/or polyarylsiloxanes and/or further constituents.

It can be advantageous if at least one Brönstedt acid or base is used as the material for making the ion-conducting composite material. It can also be advantageous if at least one trialkoxysilane solution or suspension containing acid and/or basic groups is used as the material for making the ion-conducting composite material. Preferably at least one of the acid or basic groups is a quaternary ammonium or phosphonium group or an alkylsulfonic acid, carboxylic acid or phosphonic acid group.

By means of the process according to the invention, therefore, it is possible, for example, subsequently to provide an already existing permeable composite material with an ionic finish by treatment with a silane. For this purpose a 1 to 20% solution of this silane is prepared in a water-containing solution, and the composite material is dipped therein. As the solvent there can be used aromatic and aliphatic alcohols, aromatic and aliphatic hydrocarbons and other common solvents or mixtures. Advantageously there can be used ethanol, octanol, toluene, hexane, cyclohexane and octane. After the adhering liquid has dripped off, the impregnated composite material is dried at about 150° C. and can be used as an ion-conducting permeable composite material either directly or after a plurality of subsequent steps of coating and drying at 150° C. Both silanes bearing cationic groups and silanes bearing anionic groups are suitable for this purpose.

It can also be advantageous if the solution or suspension for treating the composite material also contains acid or basic compounds and water in addition to a trialkoxysilane. Preferably the acid or basic compounds comprise at least one Brönstedt or Lewis acid or base known to those skilled in the art.

According to the invention, however, the composite material can also be treated with solutions, suspensions or sols which contain at least one ion-conducting material. This treatment can be performed one time or repeated several times. With this embodiment of the process according to the invention there are obtained layers of one or more similar or different partly hydrolyzed or nonhydrolyzed oxides, phosphates, phosphides, phosphonates, sulfates, sulfonates, vanadates, tungstates, molybdates, manganates, titanates, silicates or mixtures of these of the elements Al, K, Na, Ti, Fe, Zr, Y, Va, W, Mo, Ca, Mg, Li, Cr, Mn, Co, Ni, Cu or Zn or mixtures of these elements.

Ion-conducting permeable composite materials can be used in numerous processes. By virtue of the acid sites on the interior and/or exterior surfaces they are capable of catalyzing numerous reactions. Examples thereof are esterification and acetalization reactions, as well as rearrangements and numerous other acid-catalyzed reactions.

The ion-conducting composite materials according to the invention can also be used in fuel cells. This possibility is particularly important in view of the better thermal stability compared with polymer membranes. Heretofore the operating range of proton exchange membrane fuel cells has been limited to a maximum temperature of 120 to 130° C. by the use of Nafion as the membrane. Higher temperatures lead to a severe decrease of the ion conductivity of Nafion. In the said fuel-cell type, a higher operating temperature leads to a distinct improvement of service life, since the problem of catalyst poisoning by carbon monoxide is suppressed. In addition, a direct methanol fuel cell can be achieved more easily thereby.

The ion-conducting composite materials according to the invention are extremely suitable as ion-exchange membranes in electrolysis, membrane electrolysis and electrodialysis cells. They satisfy virtually all requirements imposed on an ion-exchange membrane for these applications. Such requirements would be good permselectivity, high ion flux and small thickness of the membrane.

Since ion-conducting layers are simultaneously highly hydrophilic, ion-conducting permeable composite materials according to one of claims 1 to 20 can be used in separation of substances by pervaporation and vapor permeation in the case of problems involving selective separation of water from organic substances. A main area of application in this case is solvent drying, where the currently used membrane materials are limited to a few solvents (ethanol and similar substances) and to temperatures below 100° C. because of the swelling behavior of the support polymers and because of the relatively low thermal stability of these polymers.

The greater thermal stability of the ion-conducting permeable composite materials according to the invention also permits use thereof for high-temperature applications of pervaporation, such as the treatment of partial streams during rectification. The enormous technical advantage under these conditions is that the partial streams to be treated no longer have to be passed through heat exchangers, but instead can be sent directly to the pervaporation membrane at the respective process temperature (which can be as high as 250° C.).

The ion-conducting composite materials according to the invention, the process for making the said materials, and the use of the same will be described by means of the following examples, without being limited thereto.

EXAMPLE 1.1
Non-ion-conducting Composite Material
  a) 120 g of titanium tetraisopropylate is intensively stirred with 140 g of deionized ice until ultrafine dispersion of the resulting precipitate. After addition of 100 g of 25% hydrochloric acid, stirring is continued until the phase becomes clear and 280 g of type CT3000SG α-alumina from Alcoa of Ludwigshafen is added, after which stirring is continued for several days until disintegration of the aggregates. A thin layer of this suspension applied on a metal gauze is then solidified at 550° C. within the shortest possible time.
  b) 40 g of titanium tetraisopropylate was hydrolyzed with 20 g of water, and the resulting precipitate was peptized with 120 g of nitric acid (25%). This solution was stirred until it became clear and, after addition of 40 g of titanium dioxide from Degussa (P25), stirring was continued until disintegration of the agglomerates. After a further 250 ml of water had been added to this suspension, it is applied on a porous support (prepared according to Example 1.1 a) and solidified at about 500° C. within the shortest possible time.

EXAMPLE 1.2
Ion-conducting Composite Material by Subsequent Treatment of a Composite Material with Silanes An inorganic permeable composite material according to Example 1.1 b was dipped in a solution comprising the following components: 5% Degussa Silane 285 (a propylsulfonic acid triethoxysilane), 20% demineralized water in 75% ethanol. Before use, the solution had to be stirred for 1 hour at room temperature.

After supernatant solution had been allowed to drip off, the composite material was dried at 80° C. to 150° C. and then used.

EXAMPLE 1.3

An inorganic permeable composite material according to Example 1.1 was dipped in a solution comprising the following components: 5% Dynasilan 1172 of the Sivento Co., 2.5% hydrochloric acid (35%), 30% ethanol and 62.5% demineralized water. Before use, the solution had to be stirred for about 30 minutes at room temperature. After supernatant solution had been allowed to drip off, the composite material was dried at 80° C. to 150° C. and then used.

EXAMPLE 1.4
Ion-conducting Composite Material by Addition of Polyelectrolytes 30 g of titanium tetraisopropylate was hydrolyzed with 20 g of water, and the resulting precipitate was peptized with 120 g of nitric acid (25%). This solution was stirred until it became clear and, after addition of 40 g of titanium dioxide from Degussa (P25) and 5 g (up to 30 g is possible) of Nafion® powder, stirring was continued until disintegration of the agglomerates. This suspension was then applied on a porous support prepared according to Example 1.1 a and solidified at about 500° C. within the shortest possible time.

EXAMPLE 1.5

50 g of titanium tetraisopropylate was hydrolyzed with 20 g of water, and the resulting precipitate was peptized with 120 g of nitric acid (25%). This solution was stirred until it became clear and, after addition of 40 g of titanium dioxide from Degussa (P25) and 15 g of a cationic polyelectrolyte (Praestol 2350 of the Stockhausen Co.), stirring was continued until disintegration of the agglomerates. This suspension was then applied on a porous support corresponding to Example 1.1 a and solidified at about 300° C. within the shortest possible time.

EXAMPLE 1.6
Ion-conducting Composite Material by Inorganic Layers 20 g of aluminum alcoholate and 17 g of vanadium alcoholate were hydrolyzed with 20 g of water, and the resulting precipitate was peptized with 120 g of nitric acid (25%). This solution was stirred until it became clear and, after addition of 40 g of titanium dioxide from Degussa (P25), stirring was continued until disintegration of all agglomerates. After the pH had been adjusted to about 6, the suspension was doctored onto a composite material prepared according to Example 1.1 a. As a result there was obtained an ion-conducting composite material provided with negative fixed charges.

EXAMPLE 1.7

20 g of aluminum alcoholate or 20 g of tetraethyl orthosilicate and 17 g of potassium permanganate were hydrolyzed with 20 g of water and completely reduced with 6% hydrogen peroxide solution. The resulting precipitate was partly peptized with 100 g of sodium hydroxide solution (25%). This suspension was stirred for 24 hours and, after addition of 40 g of titanium dioxide from Degussa (P25), stirring was continued until disintegration of all agglomerates. After the pH had been adjusted to about 8, the suspension was applied on a support prepared according to Example 1.1.a and solidified within a few seconds. By this method there was obtained an ion-conducting composite material provided with positive fixed charges.

EXAMPLE 1.8

20 g of aluminum alcoholate and 25 g of molybdenum alcoholate were hydrolyzed with 20 g of water, and the resulting precipitate was peptized with 100 g of sodium hydroxide solution (25%). This solution was stirred until it became clear. After the pH had been adjusted to about 8, the suspension was sprayed in a thin layer onto a composite material prepared according to Example 1.1.b and solidified within a few seconds. There was obtained an ion-conducting composite material provided with positive fixed charges.

EXAMPLE 1.9
Ion-conducting Composite Material by Subsequent Siloxane Coating and Heat Treatment 10% methyltriethoxysilane, 30% tetraethyl orthosiloxane and 10% silica sol (Levasil 200 of Bayer AG) and 50% water were mixed together under acid-catalysis conditions. The resulting suspension was then applied by spreading on a support according to Example 1.1.b and solidified by heat treatment at about 500° C. As a result there was obtained a cation-conducting permeable composite material.

EXAMPLE 1.10
Ion-conducting Composite Material With Zeolites 10 g methyltriethoxysilane, 30 g tetraethyl orthosiloxane and 10 g aluminum trichloride were hydrolyzed with 50 g water in 100 g ethanol. Then 190 g zeolite USY (CBV 600 of the Zeolyst Co.) was added thereto. Stirring was continued until all agglomerates had disintegrated, and then the suspension was spread onto a composite material prepared according to Example 1.1 a and solidified by heat treatment at 700° C. As a result there was obtained a cation-conducting permeable composite material.

EXAMPLE 2.1
Catalyzed Reactions (Esterification)

As catalyst for an esterification reaction, an ion-conducting composite material with negative charges on the surface was prepared as follows. 80 g of titanium tetraisopropylate was hydrolyzed with 20 g of water, and the resulting precipitate is peptized with 120 g of nitric acid (25%). This solution was stirred until it became clear and, after addition of 100 g of alumina from Alcoa and 15 g of Nafion® 117 (Aldrich), stirring was continued until disintegration of the agglomerates. This suspension was then applied on a composite material prepared according to Example 1.1 a and solidified at about 500° C. within the shortest possible time.

The composite material prepared in this way was introduced into a reaction vessel in such a way that the reaction solution (acetic acid and n-butanol in stoichiometric ratio) was pressed through the pores of the composite material. Catalyzed esterification then took place in the pores and in the downstream reaction chamber. This type of reaction procedure certainly does not lead to space-time yields as high as in a homogeneously catalyzed reaction (using p-toluenesulfonic acid as catalyst), but it has the advantage that the vessels are not corroded by the catalyst and that the catalyst does not have to be separated from the product in a special processing step. In addition, the specific active surface of the ion-conducting composite material is larger than that of the available Nafion particles, thus leading to an increase of the space-time yield compared with known heterogeneously catalyzed esterification reactions.

EXAMPLE 2.2
Fuel Cells 20 g of aluminum methanolate and 17 g of vanadium chloride were hydrolyzed with 20 g of water, and the resulting precipitate was peptized with 120 g of nitric acid (25%). This solution was stirred until it became clear and, after addition of 40 g of titanium dioxide from Degussa (P25), stirring was continued until disintegration of all agglomerates. After the pH had been adjusted to about 6, the suspension was applied on a porous support and solidified within a few seconds at about 500° C. This suspension was then applied in a very thin layer onto a porous membrane prepared according to Example 1.1 a. After heat treatment at 450° C. there is obtained a proton-conducting membrane which can be used in a PEM fuel cell.

Studies of the proton conductivity of this membrane and of a commercially available membrane (Nafion 117, Aldrich) at different temperatures and an applied voltage of 2.0 volt yielded the results listed in the following table.

| Membrane | U [V] | T [° C.] | I [mA/cm2] |
| --- | --- | --- | --- |
| Nafion 117 | 2 | 60 | 124 |
| | 2 | 80 | 107 |
| | 2 | 110 | 41 |
| | 2 | 130 | 5 |
| | 2 | 150 | <2 |
| Example 2.2 | 2 | 60 | 105 |
| | 2 | 80 | 101 |
| | 2 | 110 | 98 |
| | 2 | 130 | 71 |
| | 2 | 150 | 64 |

EXAMPLE 2.3
Elecrodialysis

Electrodialysis membranes made from organic polymers are unsuitable for processing acids or bases formed in the mixture with organic solvents. In such a case a more suitable membrane was made as follows. 80 g of titanium tetraisopropylate was hydrolyzed with 20 g of water, and the resulting precipitate is peptized with 120 g of nitric acid (25%). This solution was stirred until it became clear and, after addition of 60 g of titanium dioxide P25 from Degussa and 10 g of Nafion® 117 (Aldrich), stirring was continued until disintigration of th agglomerates.

With a cation-exchange membrane made in this way it is possible by means of electrodialysis to process substance streams which contain relatively high concentrations of plasticizers or solvents. By the use of such a membrane it was possible to process a waste water containing sodium hydroxide and relatively high concentrations of a long-chain alcohol that destroyed the organic polymer membranes due to considerable swelling.

EXAMPLE 2.5
Pervaporation

Since ion-conducting layers are simultaneously highly hydrophilic, ion-conducting permeable composite materials can be used very effectively in separation of substances by pervaporation. For this purpose there was used a membrane made as follows. 20 g of aluminum alcoholate and 25 g of molybdenyl acetylacetonate (Lancaster) were hydrolyzed with 20 g of water, and the resulting precipitate was peptized with 100 g of sodium hydroxide solution (25%). This solution was stirred until it became clear and, after addition of 40 g of titanium dioxide from Degussa (P25), stirring was continued until disintegration of all agglomerates. After the pH had been adjusted to about 8, the suspension was applied on a porous support prepared according to Example 1.1 a and solidified at 500° C. within the shortest possible time.

With this membrane it was possible to dewater a mixture of 80% ethanol and 20% water. The flux through the membrane was about 1050 g m$^{-2}$ h$^{-1}$, with an ethanol content of about 2% to 3% in the permeate. The temperature of the retentate was 115° C. The permeate pressure was 25 mbar.

What is claimed is:

1. A permeable composite material comprising at least one porous and permeable support having pores in the interior thereof, which is provided on at least one side of the support and in the pores with at least one inorganic component, which comprises at least one compound of a metal, a semi-metal or a mixed metal with at least one element of Group 3 to Group 7, wherein
   the composite material exhibits ion-conducting properties and additionally contains at least one inorganic and/or organic material which exhibits ion conducting-properties, wherein the material either (A) contains ionic groups selected from the group consisting of sulfonic acid, phosphoric acid, carboxylic acid, tetraorganylammonium, tetraorganylphosphonium groups and mixtures thereof, or (B) is at least one polymer selected from the group consisting of a sulfonated polytetrafluoroethylene, sulfonated polyvinylidene fluoride, aminolyzed polytetrafluorethylene, aminolyzed polyvinylidene fluoride, aminolyzed polysulfone, sulfonated polyether imide, and aminolyzed polyether imide, or (C) is at least one inorganic compound selected from the group consisting of phosphates, phosphonates, sulfates, and sulfonates of Zr, and silicates of K, Na and Li, wherein the at least one inorganic component is in the form of particles, and the ionic groups are organic compounds bound chemically and/or physically to the particles.

2. A composite material according to claim 1, wherein
the composite material is ion-conducting at a temperature of from −40° C. to 300° C.

3. A composite material according to claim 2, wherein
the composite material is ion-conducting at a temperature of from −10° C. to 200° C.

4. A composite material according to claim 1, wherein
the at least one inorganic and/or organic material which exhibits ion-conducting properties is contained as an admixture in the microstructure of the composite material.

5. A composite material according to claim 1, wherein
the at least one inorganic component is in the form of particles having interior and/or exterior surfaces, which surfaces are coated with a layer of
the at least one inorganic and/or organic material.

6. A composite material according to claim 5, wherein
the layer has a thickness of 0.0001 to 1 µm.

7. A composite material according to claim 5, wherein
the layer has a thickness of 0.001 to 0.05 µm.

8. A composite material according to claim 1, wherein
the composite material has a void volume in which is present
the at least one inorganic and/or organic material.

9. A composite material according to claim 8, wherein
the at least one inorganic and/or organic material fills interstices of the composite material.

10. A composite material according to claim 1, wherein
the material which exhibits ion-conducting properties is material (A).

11. A composite material according to claim 1, wherein
the particles have interior and/or exterior surfaces, and the ionic groups are bound via aryl and/or alkyl chains to the interior and/or exterior surfaces.

12. A composite material according to claim 1, wherein
the material which exhibits ion-conducting properties is material (B).

13. A composite material according to claim 1, wherein
the material which exhibits ion-conducting properties is material (C).

14. A composite material according to claim 13, wherein
material (C) is present as at least one amorphous and/or crystalline compound of Zr, which compounds bear some nonhydrolyzable groups, or a mixture of these compounds.

15. A composite material according to claim 1, wherein
the ion-conducting composite material is flexible.

16. A composite material according to claim 1, wherein
the ion-conducting composite is bendable to a minimum radius of as small as 1 mm.

17. A catalyst for acid or base catalyzed reactions comprising the permeable composite material of claim 1.

18. A membrane adapted for fuel cells comprising the permeable composite material of claim 1.

19. A membrane adapted for electrodialysis, membrane electrolysis or electrolysis comprising the permeable composite material of claim 1.

20. A pervaporation membrane comprising the permeable composite material of claim 1.

21. A vapor-permeation membrane comprising the permeable composite material of claim 1.

22. A permeable composite material comprising at least one porous and permeable support having pores in the interior thereof, which is provided on at least one side of the support and in the pores with at least one inorganic component, which comprises at least one compound of a metal, a semi-metal or a mixed metal with at least one element of Group 3 to Group 7,
wherein
the composite material exhibits ion-conducting properties and additionally contains at least one inorganic and/or organic material which exhibits ion conducting-properties, wherein the material is at least one polymer selected from the group consisting of a sulfonated polytetrafluoroethylene, sulfonated polyvinylidene fluoride, aminolyzed polytetrafluorethylene, aminolyzed polyvinylidene fluoride, aminolyzed polysulfone, sulfonated polyether imide, and aminolyzed polyether imide.

23. A process for making the composite material according to claim 1, comprising making a non ion-conducting composite material ion-conducting.

24. A process according to claim 23, wherein
the ion-conducting permeable composite material is obtained by treating a composite material which does not exhibit ion-conducting properties with at least one ion-conducting material or with at least one material which exhibits ion-conducting properties after a further treatment.

25. A process according to claim 23, wherein
the ion-conducting permeable composite material is obtained by treating a composite material which has a pore width of 0.001 to 5 µm and does not exhibit ion-conducting properties with at least one ion-conducting material or with at least one material which exhibits ion-conducting properties after a further treatment.

26. A process according to claim 23, wherein
the treatment of the composite material with at least one ion-conducting material or at least one material which exhibits ion-conducting properties after a further treatment is accomplished by impregnating, dipping, brushing, rolling on, doctoring on, spraying or other coating techniques.

27. A process according to claim 23, wherein
after the treatment with at least one ion-conducting material or at least one material which exhibits ion-conducting properties after a further treatment, the composite material is heat-treated.

28. A process according to claim 27, wherein
the heat treatment is performed at a temperature of 100 to 700° C.

29. A process according to claim 23, wherein
the ion-conducting material or the material which exhibits ion-conducting properties after a further treatment is applied in the form of a solution with a solvent proportion of 1 to 99%.

30. A process according to claim 23, wherein
there is used as the material for making the ion-conducting composite material polyorganylsiloxanes which contain at least one ionic constituent.

31. A process according to claim 30, wherein
the polyorganylsiloxanes contain among other substances a polyalkylsiloxane and/or polyarylsiloxane and/or further constituents.

32. A process according to claim 23, wherein
Brönstedt acids or bases are used as the material for making the ion-conducting composite material.

33. A process according to claim 23, wherein
at least one trialkoxysilane solution or suspension containing acid and/or basic groups is used as the material for making the ion-conducting composite material.

34. A process according to claim 33, wherein
at least one of the acid or basic groups is a quaternary ammonium or phosphonium group or an alkylsulfonic acid, carboxylic acid or phosphonic acid group.

35. A process according to claim 33, wherein
the solution or suspension for treating the composite material also contains acid or basic compounds and water in addition to a trialkoxysilane.

36. A process according to claim 33, wherein
the acid or basic compounds comprise a Brönstedt or Lewis acid or base.

37. A process according to claim 23, wherein
the ion-conducting composite material is obtained by using, during production of the composite material, at least one ion-conducting material or by using at least one material which exhibits ion-conducting properties after a further treatment.

38. A process according to claim 37, wherein
the composite material is obtained by using at least one polymer-bound Brönstedt acid or base for making the composite material.

39. A process according to claim 37, wherein
the ion-conducting composite material is obtained by using at least one sol, which contains polymer particles bearing fixed charges or polyelectrolyte solutions.

40. A process according to claim 39, wherein
the polymer bearing fixed charges or the polyelectrolyte has a melting or softening point below 500° C.

41. A process according to claim 39, wherein
the material is material (B).

42. A process according to claim 39, wherein
the proportion of the polymer bearing fixed charges or of the polyelectrolyte in the sol being used lies between 0.001% and 50.0%.

43. A process according to claim 42, wherein
the proportion of the polymer bearing fixed charges or of the polyelectrolyte in the sol being used lies between 0.01% and 25%.

44. A process according to claim 39, wherein
the polymer undergoes chemical and physical or chemical or physical modification during processing.

45. A process according to claim 39, wherein
the ion-conducting composite material is obtained by using, during production of the composite material, a sol which contains at least one ion-conducting material or at least one material which exhibits ion-conducting properties after a further treatment.

46. A process according to claim 45, wherein
there are added to the sol materials which lead to formation of inorganic ion-conducting layers on the interior and or exterior surfaces of the particles contained in the composite material.

47. A process according to claim 45, wherein
the sol is obtained by hydrolyzing at least one metal compound, at least one semi-metal compound or at least one mixed-metal compound or a combination of these compounds with a liquid, a gas and or a solid.

48. A process according to claim 47, wherein
water, steam, ice, alcohol or acid or a combination of these compounds is used as the liquid, gas and/or solid for hydrolysis.

49. A process according to claim 47, wherein
the compound to be hydrolyzed is added to alcohol and/or to an acid before hydrolysis.

50. A process according to claim 47, wherein
there is hydrolyzed at least one nitrate, chloride, carbonate or one alcoholate of a metal or semi-metal.

51. A process according to claim 50,
wherein
the nitrate, chloride, carbonate or alcoholate is a compound of the elements Ti, Zr, V, Mn, W, Mo, Cr, Al, Si, Sn and/or Y.

52. A process according to claim 45,
wherein
there is added to the sol for making the composite material at least one acid or base which is soluble in water and/or alcohol.

53. A process according to claim 52,
wherein
there is added an acid or base of the elements Li, Na, Mg, K, Ca, Ba, V, Y, Zn, Ti, Cr, W, Mo, Zr, Mn, Al, Si, P or S.

54. A process according to claim 45,
wherein
the sol contains nonstoichiometric metal, semi-metal or nonmetal oxides or hydroxides, generated by changing the oxidation number of the corresponding element.

55. A process according to claim 54,
wherein
the change in oxidation number is achieved by reaction with organic compounds or inorganic compounds or by electrochemical reactions.

56. A process according to claim 54,
wherein
the change of oxidation number is achieved by reaction with an alcohol, aldehyde, sugar, ether, olefin, peroxide or metal salt.

57. A process according to claim 54,
wherein
compounds of the elements Cr, Mn, V, Ti, Sn, Fe, Mo, W or Pb change the oxidation number.

58. A process according to claim 45,
wherein
there are added to the sol substances which lead to formation of inorganic ion-conducting structures.

59. A process according to claim 58,
wherein
zeolite and/or β-aluminosilicate particles are added to the sol.

60. A process according to claim 58,
wherein
a compound to be hydrolyzed bears nonhydrolyzable groups in addition to hydrolyzable groups.

61. A process according to claim 58,
wherein
a compound to be hydrolyzed is an alkyltrialkoxy or dialkyldialkoxy or trialkylalkoxy compound of silicon.

* * * * *